W. H. VIBBER.
ADJUSTABLE COUPLING FOR ELECTRIC INSTALLATION TUBES.
APPLICATION FILED JAN. 2, 1909.
913,588.
Patented Feb. 23, 1909.
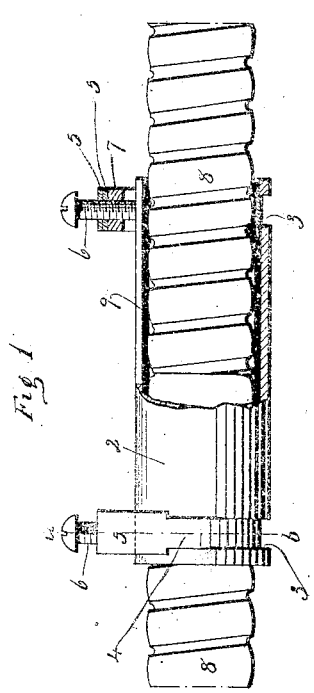
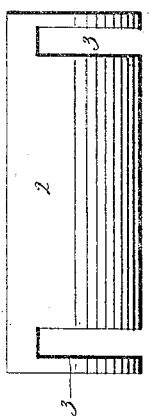
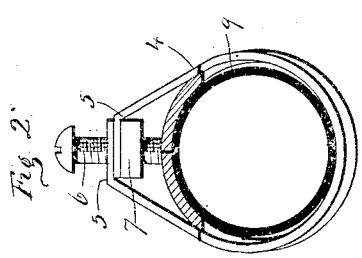

UNITED STATES PATENT OFFICE.

WHEELER H. VIBBER, OF NEW LONDON, CONNECTICUT, ASSIGNOR OF ONE-HALF TO THE GILLETTE-VIBBER CO., OF NEW LONDON, CONNECTICUT, A CORPORATION.

ADJUSTABLE COUPLING FOR ELECTRIC-INSTALLATION TUBES.

No. 913,588.

Specification of Letters Patent.

Patented Feb. 23, 1909.

Application filed January 2, 1909. Serial No. 470,463.

*To all whom it may concern:*

Be it known that I, WHEELER H. VIBBER, a citizen of the United States, residing at New London, in the county of New London and State of Connecticut, have invented a new and useful Improvement in Adjustable Couplings for Electric-Installation Tubes; and I do hereby declare the following, when taken in connection with the accompanying drawings and the numerals of reference marked thereon, to be a full, clear, and exact description of the same, and which said drawings constitute part of this specification, and represent, in—

Figure 1 a view partly in side elevation and partly in section, of an adjustable coupling for electric installation tubes, constructed in accordance with my invention. Fig. 2 a view thereof in section on the line $a$—$b$ of Fig. 1. Fig. 3 a detached view in side elevation of the coupling sleeve.

This invention relates to an improvement in adjustable couplings for electric installation tubes, the object being to produce at a low cost for manufacture, an effective, convenient water-tight coupling constructed with particular reference to coupling flexible metal tubes, though not limited to such use.

With these ends in view my invention consists in the construction and combination of parts to be hereinafter described and pointed out in the claims.

In carrying out my invention as herein shown, I employ a coupling-sleeve 2 formed near its respective ends with transverse slots 3 and consisting of a sheet of metal folded into the form of a tube or sleeve. Each of these slots receives a yielding binding-strap 4 having perforated ends 5 wider than the central portion or body of the strap, the said ends being lapped over each other and perforated for the reception of a binding screw 6 carrying a nut 7. Flexible metal electric installation tubes 8 are inserted into the opposite ends of the said sleeve 2 and held in place therein by the binding straps 4, the screws 6 being operated to move the straps transversely in the slots 3, whereby the tubes 8 are gripped by the straps and drawn by the same against the inner face of the sleeve 2 on the side thereof adjacent to the nuts 7. The tubes 8 are thus firmly connected by the coupling tube 2. Preferably I shall locate a tube 9 within the sleeve 2 so as to exclude water from the joint, the tube 9 being made of some composition containing rubber or equivalent material, enabling the tube 9 to function as a gasket. The employment of the tube 9 makes it possible to employ a folded sleeve as well as one drawn from sheet-metal. The tube 9 passes through the straps 4 and is clasped thereby firmly upon the tubes 8. The straps 4 having considerable play in the slots 3, will adjust themselves to a considerable range of variation in the diameter of the tubes 8.

I have spoken of my improvement as being particularly designed for use in conjunction with flexible metal electric installation tubes, but it may also be used with fibrous tubes, by which term I mean to include woven tubes and those covered with canvas.

I claim:—

1. In an adjustable coupling for electric installation tubes, the combination with a coupling-sleeve having its respective ends formed with transverse slots, of yielding binding-straps entering the said slots and having their ends overlapped and perforated, binding-screws passing through the overlapped and perforated ends of the straps and each carrying a binding nut, and electric installation tubes entering the opposite ends of the coupling sleeve in which they are held by the transverse adjustment of the said straps in the said slots.

2. In an adjustable coupling for electric installation tubes, the combination with a coupling sleeve formed at its respective ends with transverse slots, of binding straps located in the said slots and provided with binding screws engaging with the coupling sleeve, whereby the straps are caused to function, a flexible water-excluding tube located within the couplingsleeve and passing through the said straps, and electric installation tubes entering the opposite ends of the said flexible water-excluding tube which is clasped upon them by the said straps when the same are adjusted by the binding-screws.

In testimony whereof, I have signed this specification in the presence of two subscribing witnesses.

WHEELER H. VIBBER.

Witnesses:
MABEL B. LEWIS,
ALMEDA C. VIBBER.